(12) United States Patent
Monsheimer et al.

(10) Patent No.: US 7,708,929 B2
(45) Date of Patent: May 4, 2010

(54) PROCESS FOR PRODUCING THREE-DIMENSIONAL OBJECTS BY MEANS OF MICROWAVE RADIATION

(75) Inventors: Sylvia Monsheimer, Haltern am see (DE); Maik Grebe, Bochum (DE); Franz-Erich Baumann, Duelmen (DE)

(73) Assignee: Evonik Degussa GmbH, Essen (DE)

( * ) Notice: Subject to any disclaimer, the term of this patent is extended or adjusted under 35 U.S.C. 154(b) by 573 days.

(21) Appl. No.: 10/799,874

(22) Filed: Mar. 15, 2004

(65) Prior Publication Data

US 2004/0232583 A1 Nov. 25, 2004

(30) Foreign Application Priority Data

Mar. 15, 2003 (DE) ................................ 103 11 438
Dec. 2, 2003 (DE) ................................ 103 56 193

(51) Int. Cl.
B29C 35/08 (2006.01)
B29C 41/02 (2006.01)
H05B 6/64 (2006.01)

(52) U.S. Cl. ....................................... 264/460; 264/489
(58) Field of Classification Search ................ 264/489, 264/460, 497; 428/543, 174.4
See application file for complete search history.

(56) References Cited

U.S. PATENT DOCUMENTS

| 5,338,611 | A | * | 8/1994 | Lause et al. ................ 428/412 |
| 5,340,656 | A | * | 8/1994 | Sachs et al. ................ 428/546 |
| 5,354,414 | A | * | 10/1994 | Feygin ........................ 216/34 |
| 5,397,225 | A | * | 3/1995 | Knipp et al. ............... 425/4 R |
| 5,405,936 | A | | 4/1995 | Mumcu et al. |
| 5,425,817 | A | | 6/1995 | Mugge et al. |
| 5,668,242 | A | | 9/1997 | Simon et al. |
| 5,876,550 | A | * | 3/1999 | Feygin et al. ............... 156/264 |
| 5,932,687 | A | | 8/1999 | Baumann et al. |
| 5,980,813 | A | * | 11/1999 | Narang et al. ............... 264/401 |
| 6,060,550 | A | | 5/2000 | Simon et al. |
| 6,149,836 | A | | 11/2000 | Mumcu et al. |
| 6,243,616 | B1 | * | 6/2001 | Droscher et al. ............ 700/118 |
| 6,300,413 | B1 | | 10/2001 | Simon et al. |

(Continued)

FOREIGN PATENT DOCUMENTS

EP 0 231 588 A1 8/1987

(Continued)

OTHER PUBLICATIONS

U.S. Appl. No. 11/484,593, filed Jul. 12, 2006, Monsheimer, et al.

(Continued)

*Primary Examiner*—Leo B Tentoni
(74) *Attorney, Agent, or Firm*—Oblon, Spivak, McClelland, Maier & Neustadt, L.L.P.

(57) ABSTRACT

The present invention relates to a process for melting and adhering material to produce three-dimensional objects by means of selective heating via microwave radiation. Unlike selective laser sintering, the present process uses simple microwave radiation commonly available in any household. The selectivity of heating is achieved by applying one or more susceptors to selected regions of a layer composed of a pulverulent substrate, and then heating the susceptor by means of microwave radiation. The heated susceptor transfers the energy present therein to a pulverulent substrate surrounding the susceptor, and the substrate is thereby melted, providing firm adhesion within the substrate after cooling.

24 Claims, 1 Drawing Sheet

U.S. PATENT DOCUMENTS

| | | | |
|---|---|---|---|
| 6,316,537 B1 | 11/2001 | Baumann et al. | |
| 6,335,101 B1 | 1/2002 | Haeger et al. | |
| 6,403,002 B1 * | 6/2002 | van der Geest | 264/113 |
| 6,579,581 B2 | 6/2003 | Bartz et al. | |
| 6,589,606 B2 | 7/2003 | Waterkamp et al. | |
| 6,593,008 B2 * | 7/2003 | Schmidt | 428/539.5 |
| 6,656,997 B2 | 12/2003 | Baumann et al. | |
| 6,677,015 B2 | 1/2004 | Himmelmann et al. | |
| 6,766,091 B2 | 7/2004 | Beuth et al. | |
| 6,780,368 B2 * | 8/2004 | Liu et al. | 264/401 |
| 6,784,227 B2 | 8/2004 | Simon et al. | |
| 6,884,485 B2 | 4/2005 | Baumann et al. | |
| 6,900,254 B2 * | 5/2005 | Wills et al. | 523/221 |
| 2002/0105114 A1 | 8/2002 | Kubo et al. | |
| 2002/0145213 A1 * | 10/2002 | Liu et al. | 264/40.1 |
| 2003/0114636 A1 | 6/2003 | Schiffer et al. | |
| 2003/0124281 A1 | 7/2003 | Ries et al. | |
| 2003/0209836 A1 * | 11/2003 | Sherwood | 264/401 |
| 2004/0086735 A1 | 5/2004 | Monsheimer et al. | |
| 2004/0097636 A1 | 5/2004 | Baumann et al. | |
| 2004/0140668 A1 | 7/2004 | Monsheimer et al. | |
| 2004/0204531 A1 | 10/2004 | Baumann et al. | |
| 2004/0206443 A1 | 10/2004 | Monsheimer et al. | |
| 2004/0232583 A1 | 11/2004 | Monsheimer et al. | |
| 2005/0014842 A1 | 1/2005 | Baumann et al. | |
| 2005/0023710 A1 * | 2/2005 | Brodkin et al. | 264/16 |
| 2005/0038201 A1 | 2/2005 | Wursche et al. | |
| 2006/0180957 A1 * | 8/2006 | Hopkinson et al. | 264/405 |
| 2006/0244169 A1 | 11/2006 | Monsheimer et al. | |
| 2006/0281873 A1 | 12/2006 | Alting et al. | |
| 2007/0055044 A1 | 3/2007 | Simon et al. | |
| 2007/0104971 A1 | 5/2007 | Wursche et al. | |
| 2007/0166560 A1 | 7/2007 | Wursche et al. | |
| 2007/0260014 A1 | 11/2007 | Simon et al. | |
| 2008/0119632 A1 | 5/2008 | Baumann et al. | |
| 2008/0166529 A1 | 7/2008 | Hager et al. | |
| 2008/0213552 A1 | 9/2008 | Hager et al. | |
| 2008/0217821 A1 | 9/2008 | Goring et al. | |
| 2008/0242782 A1 | 10/2008 | Hager et al. | |
| 2008/0249237 A1 | 10/2008 | Hager et al. | |
| 2009/0088508 A1 | 4/2009 | Monsheimer et al. | |

FOREIGN PATENT DOCUMENTS

| | | |
|---|---|---|
| EP | 0 705 682 A1 | 4/1996 |
| EP | 0 888 868 A2 | 1/1999 |
| EP | 0 888 868 A3 | 1/1999 |
| WO | WO 92/08200 | 5/1992 |

OTHER PUBLICATIONS

U.S. Appl. No. 11/480,459, filed Jul. 5, 2006, Dowe, et al.
U.S. Appl. No. 10/590,935, filed Aug. 28, 2006, Monsheimer, et al.
U.S. Appl. No. 10/592,952, filed Sep. 15, 2006, Monsheimer, et al.
U.S. Appl. No. 11/561,021, filed Nov. 17, 2006, Simon, et al.
U.S. Appl. No. 11/587,795, filed Oct. 27, 2006, Monsheimer, et al.
U.S. Appl. No. 11/587,758, filed Oct. 27, 2006, Baumann, et al.
U.S. Appl. No. 11/596,365, filed Nov. 14, 2006, Monsheimer, et al.
U.S. Appl. No. 11/694,129, filed Mar. 30, 2007, Monsheimer, et al.
U.S. Appl. No. 11/671,820, filed Feb. 6, 2007, Monsheimer, et al.
U.S. Appl. No. 12/105,672, filed Apr. 18, 2008, Simon, et al.
U.S. Appl. No. 12/131,425, filed Jun. 2, 2008, Monsheimer, et al.
U.s. Appl. No. 12/089,926, filed Jun. 4, 2008, Haeger, et al.
U.S. Appl. No. 11/816,556, filed Jan. 28, 2008, Wursche, et al.
U.S. Appl. No. 12/192,208, filed Aug. 15, 2008, Goering, et al.
U.S. Appl. No. 60/831,222, filed Jul. 17, 2006, Hager, et al.
U.S. Appl. No. 12/407,065, filed Mar. 19, 2009, Monsheimer, et al.
U.S. Appl. No. 11/293,360, filed Dec. 5, 2005, Monsheimer, et al.
U.S. Appl. No. 11/241,667, filed Oct. 3, 2005, Monsheimer, et al.
U.S. Appl. No. 11/356,416, filed Feb. 17, 2006, Monsheimer, et al.
U.S. Appl. No. 11/335,587, filed Jan. 20, 2006, Monsheimer, et al.
U.S. Appl. No. 10/565,779, filed Jan. 25, 2006, Monsheimer, et al.
U.S. Appl. No. 11/354,114, filed Feb. 15, 2006, Dowe, et al.
U.S. Appl. No. 11/354,100, filed Feb. 15, 2006, Dowe et al.

* cited by examiner

PROCESS FOR PRODUCING THREE-DIMENSIONAL OBJECTS BY MEANS OF MICROWAVE RADIATION

FIELD OF THE INVENTION

The invention relates to a process for producing three-dimensional objects from a pulverulent substrate by melting and adhering, for example, by fusion or sintering, parts of the substrate; the heat needed for the melting of the substrate being generated by microwave radiation by way of a susceptor, and being transferred by way of the susceptor to the subregions of the substrate.

BACKGROUND OF THE INVENTION

There is a need for the rapid production of prototypes. The stereolithography method used in the production of prototypes, needs complicated support structures for the preparation of prototypes from a liquid (resin), and the resultant prototypes have relatively poor mechanical properties, attributable to a limited number of starting materials.

Another process for rapid prototyping is selective laser sintering (SLS), which has now become widespread. In this process, polymer powders in a chamber are selectively irradiated briefly with a laser beam, which results in the melting of the powder particles on which the laser beam falls. The molten particles coalesce and solidify again relatively rapidly to give a solid mass. Complex three-dimensional bodies can be produced simply and rapidly by this process, by repeatedly applying fresh layers of polymer and irradiating these layers.

The process of laser-sintering (rapid prototyping) to form moldings composed of pulverulent polymers is described in detail in U.S. Pat. No. 6,136,948 and WO 96/06881 (both DTM Corporation). The SLS processes described have the disadvantage of requiring expensive laser technology. The laser, functioning as energy source, is extremely expensive and sensitive, as also is the optical equipment needed for the production and control of the laser beam, such as lenses, expanders, and deflector mirrors.

Other processes have been developed for rapid prototyping, but have not been introduced into the market. For example, WO 01/38061 describes a process for producing prototypes which is based on the use of sinter inhibitors that inhibit sintering, initiated by the introduction of energy, of pulverulent substrate in selected regions. This process can operate without any complicated laser technology. However, the specific introduction of heat cannot be used with this process. Also, another disadvantage of this process is that the surrounding powder which was not melted still contains the inhibitor, and therefore, cannot be recycled. In addition, this process requires the development of new software, specifically because it is the surrounding area that is printed, and not, as in other cases, the cross section of the part. For undercuts and changes in cross section, large-surface-area application of inhibitors is needed. In addition, there is the risk of heat build up in the developing prototype.

In U.S. Pat. No. 5,338,611, the use of microwave radiation for the melting of polymers is described. In this process, pulverulent polymers and nano-scale carbon black are used. However, this reference does not describe the production of prototypes. Reference DE 197 27 677 describes a method of generating prototypes, by exposing selected regions of pulverulent layers to a focused microwave beam. The controlled microwave beam bonds the exposed pulverulent substrates within a layer, and also bonds these substrates to the pulverulent substrates in the layer situated thereunder. Bonding takes place via adhesive bonding, sintering, or fusion. This process also requires complicated technology in order to ensure that the microwave radiation reaches only the selected regions.

All of the prototype-production processes known use relatively complicated technologies. In particular, the use of lasers or focused microwave radiation requires high precision, and therefore, requires apparatus which is expensive and susceptible to failure. Although the known processes are suitable for producing prototypes, these processes are, however, unsuitable for rapid manufacturing applications, or for applications in the home.

SUMMARY OF THE INVENTION

Accordingly, one object of the present invention is to provide a process for the production of three-dimensional objects. Another object of the invention is to provide a process for the production of three-dimensional objects using a simple, low cost apparatus that is substantially unsusceptible to failure. The components of the apparatus should preferably be of robust design.

A further object of the invention is to provide an object produced by one or more of the above processes.

In addition, another object of this invention is to provide an apparatus for the production of three dimensional objects, according to one or more of the above processes.

These and other objects of the invention have been satisfied, either individually or in combinations thereof, by the discovery of a process for producing a three-dimensional object, comprising the following steps:

a) providing a layer of pulverulent substrate, b) selectively applying at least one microwave-absorbing first susceptor to one or more regions of the substrate, wherein the one or more regions are selected in accordance with a cross section of the three-dimensional object, and c) treating the layer at least once with microwave radiation, to melt the one or more regions containing the first susceptor to the layer of pulverulent substrate, and, optionally, to melt the one or more regions containing the first susceptor with other regions located in one or more substrate layers situated thereunder, thereabove, or combinations thereof, wherein, said other regions optionally contain a microwave-absorbing second susceptor, and wherein said first susceptor and said second susceptor are the same or different, and d) cooling the layer.

Additional objects of the invention have been satisfied by the production of three-dimensional objects prepared according to the process of the present invention, and by an apparatus for producing three-dimensional objects according to the process of the invention.

Surprisingly, it has been found that three-dimensional objects can be produced from pulverulent substrates relatively simply by means of microwave radiation, for example, even by means of microwave kitchen equipment, by applying one or more susceptors to those regions to be bonded in a layer of a pulverulent substrate. The pulverulent substrate absorbs microwave radiation only poorly or not at all, while the susceptor(s) absorbs the radiation and passes the energy absorbed in the form of heat to the substrate surrounding the susceptor(s). This results in the melting and fusing of the substrate and where appropriate, the melting and fusing of the substrate to another substrate layer situated thereunder or thereover. The susceptible regions may be fused or sintered. The susceptor may be applied using a printing head, similar to that of an ink jet printer.

BRIEF DESCRIPTION OF THE FIGURE

Various other objects, features and attendant advantages of the present invention will be more fully appreciated, as the same become better understood from the following detailed description, when considered in connection with the accompanying drawing, in which referenced characters, designate like or corresponding parts.

DETAILED DESCRIPTION OF THE PREFERRED EMBODIMENTS

Figure 1:
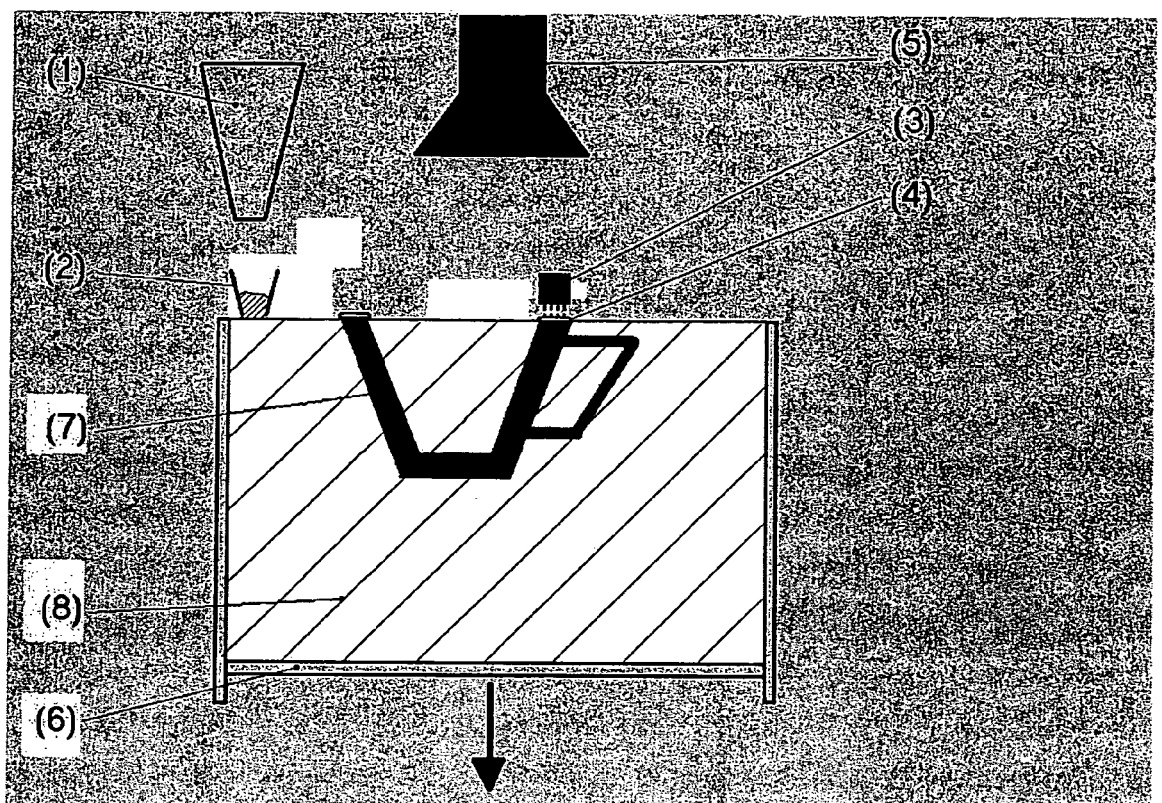
FIG. 1 is a graphical representation of a preferred apparatus of the present invention.

The present invention provides a process for producing a three-dimensional object, comprising:
  a) providing a layer of pulverulent substrate,
  b) selectively applying at least one microwave-absorbing first susceptor to one or more regions of the substrate, wherein the one or more regions are selected in accordance with a cross section of the three-dimensional object, and
  c) treating the layer at least once with microwave radiation, to melt the one or more regions containing the first susceptor to the layer of pulverulent substrate, and, optionally, to melt the one or more regions containing the first susceptor with other regions located in one or more substrate layers situated thereunder, thereabove, or combinations thereof,
  wherein, said other regions optionally contain a microwave-absorbing second susceptor, and wherein said first susceptor and said second susceptor are the same or different, and
  d) cooling the layer.

In this process, the susceptor is applied in accordance with the cross section of the three-dimensional object, and specifically may be applied in such a way that the susceptor is applied only to the regions which make up the cross section of the three-dimensional object.

The present invention also provides an apparatus for the production of three dimensional objects, comprising:
  a means for applying a layer of pulverulent substrate to a platform or to a prior layer of pulverulent substrate,
  a means for applying one or more susceptors to one or more selected regions of the layer of pulverulent substrate, and
  a means for generating microwave radiation.

The present apparatus may be used for a layer-by-layer production of three dimensional objects. The pulverulent substrate may be applied to an operating platform or to a previous layer of a treated or untreated pulverulent substrate. The means for applying the substrate and/or the susceptor, include, but are not limited to, a movable apparatus, including, but not limited to, an apparatus that moves along a plane coplanar to the plane defined by the layer of pulverulent substrate, and preferably in a vertical and/or horizontal plane. In one embodiment, the movable apparatus consists, in part, of an operating platform. In a preferred embodiment, the movable apparatus is present on an operating platform, and is movable coplanar to a plane defined by the layer of pulverulent substrate. In another preferred embodiment, the movable apparatus is movable coplanar to a plane for the application of the susceptor(s) to selected regions of a layer of pulverulent substrate, which defines the plane.

The means for generating microwave radiation, include, but are not limited to, a microwave generator, suitable for generating microwave radiation in the range from about 300 MHz to about 300 GHz.

The present process has the advantage that it does not require the use of complicated directed radiation, such as laser radiation or narrowly focused microwave radiation. The controlled exposure of certain locations of one or more layers of substrate to the microwave energy, is achieved via the excitation of the susceptor(s) by microwave radiation; the susceptor(s) being applied to the desired regions of the layer or of the layers of the substrate.

The present process is a simple way of permitting a layer-by-layer automated build up of a three-dimensional object, using microwave radiation in combination with one or more suitable susceptors. Substrate powder not treated with susceptor may readily be reused, which is contrary to processes which use inhibitors.

The apparatus may be similar to that of a conventional ink jet printer. The apparatus may also, by way of example, be linked to a computer, such as a PC, particularly if the microwave irradiation is carried out in the microwave equipment present, as a matter of course, in most households. Printing in one or more dimensions can be accomplished using normal household equipment, such as conventional microwave devices. Another advantage of the present process is that the surrounding material can easily be reused. In addition, specific components that provide certain properties, such as electrical conductivity or a particular color, can be "printed" concomitantly. Thus, an object may be provided concomitantly with carefully selected properties.

In rapid-prototyping processes, the three dimensional object is built up layer-by-layer. The method is based on the fixation or bonding of regions of liquid layers (stereolithography) or powder layers (laser sintering), within a layer or among layers situated thereunder, by supplying energy to these regions of the respective layers. Those regions of the layers to which no energy is introduced remain in the form of liquid or powder. A three-dimensional object is obtained layer-by-layer via repetition of the particular application and bonding or fixing of the powder or liquid. Removal of the unconverted powder or of the unconverted liquid gives a three-dimensional object, the resolution of which (in relation to the outlines) depends on the layer thickness and on the particle size of the pulverulent substrate.

In known processes, energy is not supplied directly to the substrates to be melted by way of a susceptor, which absorbs the energy and transfers it in the form of heat to the substrate surrounding the susceptor. The present process introduces the energy to the susceptor in the form of microwave radiation, which is absorbed by the susceptor, converted into heat, and transferred to the surrounding pulverulent material of the substrate, which is incapable of directly absorbing microwave radiation, or incapable of directly absorbing it to a sufficient extent. In this context, the phrase "incapable of directly absorbing microwave radiation to a sufficient extent" means either that microwave radiation does not heat the substrate sufficiently to bond the substrate by melting and fusing the substrate, for example, via fusion or sintering, with adjacent substrate particles, or that the time needed for this melting is excessive. However, the heat transferred from the susceptor is sufficient to bond by melting and fusing, for example, via fusion or sintering, the pulverulent substrate adjacent to the susceptor, and also to melt and fuse substrate to the susceptor.

The present process can thus produce three-dimensional objects via the melting and fusion of a pulverulent substrate.

As in laser sintering and the other rapid-prototyping processes, the melting and fusing of the substrate in certain regions within the layer, again takes place in particular, via fusion or sintering, of the pulverulent substrate. The functional principle of rapid prototyping may be found, for example, in U.S. Pat. No. 6,136,948 and WO 96/06881.

The selected application of the susceptor(s), which can be done using computer-controlled applications, such as CAD applications used to calculate cross sections, results in the melting of selected regions of the pulverulent substrates in a subsequent radiation step. The susceptor(s) can be applied only to those regions of the substrate layer within the cross section of the three dimensional object to be produced. A printing head apparatus equipped with nozzles can be used for the application of the susceptor(s). Once the radiation step has been concluded for the final layer, the present process results in a matrix, which contains in part, melted and fused powder material. This matrix reveals the solid three-dimensional object once the unfused powder has been removed.

The present process is described in more detail below by way of example, provided herein for purposes of illustration only and is not intended to be limiting.

The present process for producing a three-dimensional object comprises the steps of a) providing a layer of pulverulent substrate, b) selectively applying at least one microwave-absorbing first susceptor to one or more regions of the substrate, wherein the one or more regions are selected in accordance with a cross section of the three-dimensional object, and c) treating the layer at least once with microwave radiation, to melt the one or more regions containing the first susceptor to the layer of pulverulent substrate, and, optionally, to melt the one or more regions containing the first susceptor with other regions located in one or more substrate layers situated thereunder, thereabove, or combinations thereof, wherein, said other regions optionally contain a microwave-absorbing second susceptor, and wherein said first susceptor and said second susceptor are the same or different, and d) cooling the layer.

In one embodiment of the invention, step c may be carried after one or more consecutive executions of steps a and b. The above method also takes into account the material-dependent penetration depth of the microwave radiation, as required by the powder material used for the substrate. For example, depending on the powder material and on the number of steps a, a single treatment with microwave radiation may not be sufficient to melt all of the regions treated with susceptor, in the layer or layers of substrate present in a construction chamber. In another situation, it may be advantageous to carry out step c, by way of example, after 2, 3, 4, 5, 6, 7, 8, 9, 10, 11, 12, 13, 14, 15, 20, 30, 40, or 50 repetitions of steps a and b. It may also be advantageous to delay carrying out step c until steps a and b have been executed at least twice, to produce a more secure adhesion between the layers.

In one particular embodiment of the present process, steps a and b are repeated until all of the cross sections which compose the three dimensional object are present within a matrix, and the outer limits of the object are formed by the boundary between powder material containing applied susceptor(s) and powder material not containing susceptor(s), and then step c is carried out. This method requires treatment with microwave radiation at the final stage of the object's formation, and thus significantly lowers energy cost.

In another embodiment of the present process, at the start of production of the three-dimensional object, step c is initially carried out once, after one execution of step a, followed by one execution of step b, and then another execution of step a. In this embodiment, further steps are carried out in the sequence, b, a, and c. In this particular embodiment, an untreated powder layer covers each susceptor-treated powder layer. In step c, therefore, the particles of the uppermost layer are not melted and fused, for example, via fusion or sintering, but the particles of the layer situated thereunder are melted and fused, and in addition, the particles of these two layers are melted and fused at the boundary between the layers. This method can produce a particularly durable adhesion between the layers. In addition, the transitions from one layer to the next layer in the finished object become softer. Step c may also be carried out after one or more consecutive executions of steps b and a, which results in the advantages mentioned above.

If step c is executed after one or more consecutive executions of steps a and b, or after one or more consecutive executions of steps b and a, the execution(s) of step c may take place directly in a construction chamber. If step c is executed only once, this step may take place in a lower construction chamber, or in another suitable place within the apparatus. Step c may also be carried out in an apparatus other than the apparatus used for carrying out steps a and b. By way of example, a matrix generated by means of steps a and b, and composed of treated powder layers, may be transferred into a commercially available, food-preparation microwave equipment, where step c is then carried out. These possibilities make the present process particularly suitable for applications in the home.

By way of example, a pulverulent layer may be provided by applying a powder material as substrate to a base plate, or to a layer which is present at this stage, and which has been treated according to step b or c. The method of application may be doctoring, rolling, or broadcasting and subsequent stripping, or a similar method. The layer should be of uniform height. The height of the layer provided in step a is preferably less than about 1 mm, more preferably from about 50 to about 500 µm, and most preferably from about 100 to about 200 µm. The height of each layer will determine the resolution, and therefore the smoothness of the external structure of the three-dimensional object produced. The base plate, or else the apparatus or support for providing the layer, may be designed with an adjustable height feature so that after step b or c has been carried out, either the resultant layer can be lowered by an amount equal to the height of the layer to be applied next, or the apparatus can be raised by an amount equal to the difference in height of the next layer over the preceding layer.

The height of the layer provided in step a depends, inter alia, on the maximum particle size. Firm and compact layers of uniform height are difficult to produce using particles whose average size is 150 µm or greater, because the volume between the particles undergoes great shrinkage in step c.

In one embodiment of the invention, the powder material used as pulverulent substrate has a median grain size ($d_{50}$) of from about 10 to about 150 µm, preferably from about 20 to about 100 µm and more preferably from about 40 to about 70 µm. Depending on the application, however, powder materials comprising smaller particles, and also those comprising larger particles, may be used. Three-dimensional articles with maximum resolution and maximum surface smoothness, may be obtained using particles whose median particle size is from about 10 to about 45 µm, preferably from about 10 to about 35 µm, and more preferably from about 20 to about 30 µm.

Difficulties are encountered in the processing of fine materials smaller than 20 µm, and in particular smaller than 10 µm, because these particles do not flow well, and bulk densities significantly decrease. These features can increase the production of cavities in the final object. To ease operations, it is advantageous to use particles whose median size is from about 60 to about 150 µm, preferably from about 70 to about 120 µm, and more preferably from about 75 to about 100 µm.

In one embodiment of the invention, the pulverulent substrate preferably comprises a powder material prepared by milling, precipitation, and/or anionic polymerization, or by a combination of these processes. In a preferred embodiment, the pulverulent substrate comprises a precipitation of a somewhat excessively coarse powder, which has been subsequently milled, or a precipitation of a powder which has been subsequently classified to adjust the particle size distribution.

The particle size distribution may be selected, as desired, for the stated median grain sizes of the powder materials. In one embodiment, powder materials which have a broad or narrow grain size distribution, preferably a narrow grain size distribution, are used. In a preferred embodiment, pulverulent materials have a particle size distribution, in which, based on the median particle size, not more than about 20% of the particles have a particle size deviation of more than 50%. Preferably not more than about 15% of the particles have a particle size deviation of more than 50%, and more preferably not more than about 5% of the particles have a particle size deviation of more than 50%. The particle size distribution may be adjusted by conventional classification methods, for example, pneumatic separation. A very narrow particle size distribution results in three-dimensional objects which contain a highly uniform surface and highly uniform pore distribution.

At least a part of the pulverulent material used may be amorphous, crystalline, or semicrystalline. Preferred powder material has a linear or branched structure. Particularly preferred powder material has, at least in part, a melting point of from about 50 to about 350° C., preferably from about 70 to about 200° C.

Substrates suitable in the present process are substances whose susceptibility to heating by, or absorption of, microwave radiation is less than that of the selected susceptors. The pulverulent substrates used should also exhibit sufficient flowability in the heated state. Particular pulverulent substrates which may be used include polymers or copolymers, including, but not limited to, polyester, polyvinyl chloride, polyacetal, polypropylene, polyethylene, polystyrene, polycarbonate, poly(N-methylmethacrylimide) (PMMI), polymethyl methacrylate (PMMA), ionomer, polyamides, copolyester, copolyamides, terpolymers, acrylonitrile-butadiene-styrene copolymers (ABS), or mixtures thereof.

A powder material preferably used as a pulverulent substrate is one in which at least one nylon 6, nylon 11, and/or nylon 12, or a copolyester, or a copolyamide, is present. The use of polyamides can give three-dimensional moldings with particular dimensional stability. It is particularly preferable to use nylon 12 powder, preferably prepared as described in DE 197 08 946 (herein incorporated by reference in its entirety), or else as described in DE 44 21 454 (herein incorporated by reference in its entirety), and which preferably has a melting point and an enthalpy of fusion as stated in EP 0 911 142 (herein incorporated by reference in its entirety). Preferred copolyamides or copolyesters are those obtainable from Degussa AG with the trademark VESTAMELT. The melting point of the preferred copolyamides, determined by differential scanning calorimetry (DSC), is from about 76 to about 159° C., preferably from about 98 to about 139° C., and more particularly preferably from about 110 to about 123° C.

By way of example, the copolyamides may be prepared by polymerizing mixtures of suitable monomers, including, but not limited to, those selected from laurolactam and/or caprolactam, as one or more bifunctional components; suberic acid, azelaic acid, dodecanedioic acid, adipic acid and/or sebacic acid, as one or more components bearing an acid function; and 1,6 hexanediamine, isophoronediamine, and/or methylpentamethylenediamine as one or more diamines.

One or more additives may be used to improve processability of the pulverulent substrates. By way of example, these additives may act as flow aids. The pulverulent substrate may comprise from about 0.05 to about 5% by weight, and preferably from about 0.1 to about 1% by weight, of additives, based the total weight of the of the components of the substrate. Flow aids include, but are not limited to, fumed silicas, stearates, or other flow aids known from the literature, for example, tricalcium phosphate, calcium silicates, $Al_2O_3$, MgO, $MgCO_3$, or ZnO. By way of example, fumed silica is supplied by Degussa AG with the trademark Aerosil®. In addition, the pulverulent substrate may contain one or more laser-activatable additives. By way of example, these additives permit the three-dimensional objects to be subsequently inscribed or equipped with electrical conductor tracks. Reference DE 4402329 (herein incorporated by reference in its entirety) describes additives which may be used, by way of example.

Other additives may be incorporated into the pulverulent substrates of the invention, such as inorganic fillers. These fillers help to reduce shrinkage of the three-dimensional object because they retain their shape to a substantial extent during the radiation treatment. In addition, the use of fillers permits, by way of example, alteration of the plastic and physical properties of the objects. For example, certain fillers comprising a metal component can be used to adjust not only the transparency and color of the object, but also its magnetic or electrical properties. Examples of fillers which may be used in the powder material, include, but are not limited to, glass particles, ceramic particles or metal particles. Typical fillers include granulated metal, aluminum powder, steel shot, or glass beads. It is particularly preferable to use powder materials which contain glass beads as filler. In one preferred embodiment, the inventive powder material contains from about 1 to about 70% by weight, preferably from about 5 to about 50% by weight, and more preferably from about 10 to about 40% by weight, of fillers, based on the total weight of the powder material.

The pulverulent substrate used according to the invention may also comprise inorganic or organic pigments. The invention uses not only pigments that affect the color of the three-dimensional body, but also pigments that affect other physical properties of the three-dimensional object, such as magnetic pigments, or conductivity pigments. For example, conductivity-modified titanium dioxide or tin oxide can alter the magnetic properties and the conductivity of the object. In a preferred embodiment of the invention, the substrate comprises inorganic or organic color pigments selected from chalk, ochre, umber, green earth, burnt siena, graphite, titanium white (titanium dioxide), white lead, zinc white, lithopone, antimony white, carbon black, iron oxide black, manganese black, cobalt black, antimony black, lead chromate, mennium, zinc yellow, zinc green, cadmium red, cobalt blue, Prussian blue, ultramarine, manganese violet, cadmium yellow, Schweinfurter green, molybdate orange, molybdate red, chrome orange, chrome red, iron oxide red, chromium oxide green, strontium yellow, metallic-effect pigments, pearlescent pigments, luminescent pigments using fluorescent and/or phosphorescent pigments, umber, gamboge, animal charcoal, Cassel brown, indigo, chlorophyll, azo dyes, indigoids, dioxazine pigments, quinacridone pigments, phthalocyanine pigments, isoindolinone pigments, perylene pigments, perinone pigments, metal complex pigments, alkali blue pigments, and diketopyrrolopyrrole. By way of example, further information relating to pigments which may be used may be found in Römpp Lexikon Chemie [Römpp Chemical Encyclopedia]—Version 2.0, Stuttgart/New York: Georg Thieme Verlag 1999, and in the references given therein.

The particle sizes of the pigments used may be those described above for the powder material comprising the pulverulent substrate. However, the pigments frequently have particle sizes significantly smaller than the median grain sizes of polymers used. By way of example, the pigments may be applied in a manner similar to that for the susceptors, via nozzles, such as those used in printing heads, or may already be present in the pulverulent substrates used, and in particular in the polymer particles used. In a preferred embodiment, the powder material comprises polymer particles which contain one or more of the pigments mentioned above, and preferably do not contain only white pigments. The proportion of the pigments in the powder material is preferably from about 0.01 to about 25% by weight, with preference from about 0.1 to about 10% by weight, and particular preference from about 1 to about 3% by weight, based on the total weight of the powder material. The ability to use pigmented substances is a further advantage of the present process over laser-sintering processes, since color metallized pigments impede or attenuate the laser beam and thus prevent processing of the such substances.

The powder material may also comprise substances which may be regarded as a specific form of the abovementioned fillers or pigments. The powder may comprise grains of a first material with a size which is smaller than the abovementioned dimensions of the powder material. The grains of the first material are coated with a layer of a second material, wherein the selection of the thickness of the layer is such that the powder material, containing this combination of the first material and second material coating, has a resultant size as discussed above. The grains of the first material preferably have an average size which deviates by less than about 25%, preferably by less than about 10%, and more preferably by less than about 5%, from the average size of the grains of the powder material. The second material, which makes up the coating of the grains of the first material, is less susceptible than the selected susceptors to direct heating by microwave radiation. The second material should also exhibit sufficient flowability in the heated state, and should be capable of melting or sintering on exposure to heat, the heat being that provided by the susceptor.

Coating materials which may be used include, but are not limited to, the abovementioned polymers or copolymers, preferably selected from polyester, polyvinyl chloride, polyacetal, polypropylene, polyethylene, polystyrene, polycarbonate, poly(N-methylmethacrylimide) (PMMI), polymethyl methacrylate (PMMA), ionomer, polyamides, copolyester, copolyamides, terpolymers, acrylonitrile-butadiene-styrene copolymers (ABS), mixtures thereof, or phenolic resins. By way of example, the first material of this specific form of the powder material may encompass grains of sand, ceramics, metal, and/or alloys. Particularly preferred powder material of this type is a phenolic-resin-coated or a thermoplastic-coated sand, known as molding sand.

If the susceptor is capable of transferring a sufficient amount of heat, it is also possible for the powder material to comprise metal powders, in particular powders of low-melting metals, e.g., lead or tin, or alloys which comprise tin or lead. This powder material preferably has the abovementioned dimensions. (If metal powder is used, a check first has to be made as to whether the metal is suitable for microwave treatment, or whether sparking occurs, or irreversible damage to the microwave generator. This check can be carried out by simple preliminary experiments.)

The present process can therefore produce three-dimensional objects which may contain one or more functionalized layers. For example, the entire molding may have conductive layers throughout, or contain only certain conductive regions, through application of appropriate pigments or other additives in a manner similar to that for the susceptor, or through the application of a layer composed of a pulverulent substance containing these pigments.

The method for applying the susceptor may be based on the inhibitor application method described in WO 01/38061 (which is herein incorporated by reference in its entirety). The susceptor is preferably applied using an apparatus movable coplanar to a plane defined by the substrate layer. The apparatus is capable of transferring liquid and/or pulverulent susceptors at defined sites on the layer provided in step a. By way of example, the apparatus may consist of a printing head, such as that used in an ink jet printer. The apparatus may also contain a guide for positioning the printing head, such as that used to guide the printing head in an ink jet printer; the positioning of the printing head may likewise take place in similar fashion to the positioning of the printing head of an ink-jet printer. Using such an apparatus, the susceptor is applied at those sites on the layer provided in step a, where the substrate is to be bonded, for example by sintering or fusion.

Susceptors (first susceptor and/or second susceptor) which may be used in the present process are any of those which are heated by microwave radiation. These include, but are not limited to, pulverulent substances, e.g., metal powders, metal compounds, ceramic powders, graphite, carbon black, activated charcoal, water or protic liquids selected from the group consisting of saturated mono- or polyhydric linear, branched, or cyclic aliphatic alcohols, or mixtures thereof, each undiluted, or mixed with water. Preferred protic liquids include glycerol, trimethylolpropane, ethylene glycol, diethylene glycol, butanediol, or mixtures thereof, each undiluted, or mixed with water. It is also possible to use a mixtures of susceptors, containing one or more liquid susceptors, one or more solid susceptors, or combinations of liquid and solid susceptors. It may also be advantageous to suspend solid susceptors in liquids which are not susceptors, in order to achieve better distribution of the solid susceptors over the entire depth of the substrate layer provided. The susceptor, in particular a liquid susceptor, may also be equipped with surfactants for better wetting of the substrate.

The present invention encompasses a large number of combinations of susceptors and substrate, wherein there is a sufficient difference between susceptor and substrate in terms of their susceptibility to direct heating by microwave radiation. This difference results in a matrix which has a clear boundary between melted/fused (i.e. susceptor-treated) substrate and unfused substrate. This ensures that the three-dimensional object produced has a sufficiently smooth outline, and can be readily released from the unfused substrate.

To permit a sufficient amount, and a sufficient duration, of heat transfer from susceptor to the substrate, the boiling point of the susceptor, or in the case of a mixture of susceptors, the boiling point of at least one susceptor, should be higher than the melting point of the substrate used. When metering the susceptor, and in particular, a liquid susceptor, the properties of the substrate powder and the susceptor should be matched to ensure that the susceptor is absorbed by the powder to be wetted, and to prevent the susceptor from running through the substrate layers. Suitable matches can be made, in one fashion, by adjusting the viscosity of the susceptor and the amount of the susceptor. The amount of the liquid susceptor is particularly dependent on the layer thickness of the substrate powder, the porosity of the powder, and the particle size of the powder. The ideal amount and viscosity for a particular combination of materials may be determined by simple preliminary experiments. To adjust viscosity of the susceptor and/or the substrate, use may be made of known thickeners, such as fumed silicas, or other organic agents. The susceptor may remain in the melt or in the molding, which may be advantageous if the susceptor provides reinforcement or adjusts other properties (e.g., electrical or magnetic conductivity).

The energy needed for heating the susceptor is introduced in the form of microwave radiation. It may also be advantageous to heat the layers to be sintered to an elevated temperature, or to keep them at an elevated temperature, this temperature being below the melting point or sintering point of a polymer or copolymer used. This method can reduce the amount energy or power level introduced in the form of microwave energy. However, a disadvantage of this design is that specific apparatus is required, not in conventional use, for example, conventional ovens combined with, or incorporated with, microwave equipment would be required. However, if such devices become more widespread, some of the energy required for sintering, or other types of bonding, can be introduced by means other than microwave energy.

The treatment with microwave radiation in step c, as described above, may take place after each step b, or else may be delayed until all of the layers have been treated with the susceptor. In particular if a liquid susceptor is used, it is advantageous to use microwave treatment directly after each treatment of a layer in step b, preferably directly in a construction chamber, to reduce the risk that the liquid susceptor will disperse into undesired parts of the layer or undesired parts of the matrix composed of two or more layers.

In one embodiment of the invention, the microwave radiation is generated by an external microwave generator, and may lie within the frequency range from about 300 MHz to about 300 GHz. The frequencies nationally approved, and used in industrial processes, are generally from 430 to 6,800 MHz (Encyclopedia of Chemical Processing and Design, Vol. 30, p. 202 et seq., Marcel Dekker, N.Y., Basle, 1989). Microwave radiation in the frequency range from about 430 to about 6,800 MHz is therefore preferably used in the present process. The radiation generated by the microwave generator may, where appropriate, be polarized and/or filtered.

Three-dimensional moldings can be produced by the processes of the present invention. These three dimensional objects, produced layer-by-layer, are present at the end of the present process, within a matrix, which is formed from two or more layers. The object may be removed from this matrix, which is composed of melted and fused and unfused substrate. The unfused substrate may be reused, where appropriate, after separation, for example, by sieving. The inventive moldings may also contain additives, such as fillers, selected from glass beads, silicas, or metal particles.

The present process is preferably carried out in an inventive apparatus for the layer-by-layer production of three-dimensional objects, which comprises a means for applying a layer of pulverulent substrate to a platform or to a prior layer of a pulverulent substrate a means for applying one or more susceptors to one or more selected regions of the layer of pulverulent substrate, and a means for generating microwave radiation.

In one embodiment of the invention, the substrate is applied by a movable apparatus, which may be present on an operating platform, for example, a doctor. In another embodiment, the susceptor is applied by an apparatus movable coplanar to a plane defined by the substrate layer, for example, a printing head. In a further embodiment of the invention, a microwave generator is used to generate microwave radiation, preferably in the range from about 300 MHz to about 300 GHz, and more preferably from about 430 to about 6,800 MHz.

In another preferred embodiment, the apparatus is equipped with two or more feed vessels which can be used to introduce the substrate and/or one or more susceptors. Pressure heads with two or more nozzles and with provision of a mixer, can be used to introduce a mixture of susceptors to certain zones within a layer, for example, at particularly filigree regions or at the margin of the object to be produced. It is noted that the susceptor or susceptors used at the boundaries of an object may differ from the susceptor or susceptors used in the core region of the object to be produced. For example, different concentrations of a susceptor may be used, combinations of two or more susceptors may be used, or substances that act as a susceptor only in combination, and whose proportions may be varied in the combination, may be used. These methods permit different amounts of energy to be introduced at different positions within the layer.

The present invention also provides a powder material, as described above, suitable for use in the present process, and in particular having a median grain size of from about 10 to about 150 μm, and comprising at least one polymer or copolymer, selected from polyvinyl chloride, polyester, polyacetal, polypropylene, polyethylene, polystyrene, polycarbonate, PMMA, PMMI, ionomer, polyamides, copolyester, copolyamides, terpolymers, ABS, or mixtures thereof. The powder preferably comprises nylon-11, nylon-12, copolyamide, copolyester, or mixtures thereof. The powder more preferably comprises polymer particles which have been colored and whose color is non white.

The present process and the present apparatus are further illustrated using FIG. 1, but there is no intention that the invention be restricted to that embodiment. FIG. 1 is a representative diagram of the present apparatus. Untreated pulverulent substrate, located within (2), which has previously been charged to a feed vessel (1) is built up on a movable base (6) to give a matrix (8). A doctor (2) is used to distribute the substrate to give thin layers on the movable base or on the previously applied layers. The susceptor (4) is applied to selected regions of the layer composed of pulverulent substrate, by way of an apparatus (3) movable in the x, y plane. After each treatment with a susceptor, a fresh layer of the pulverulent substrate is applied. The sites on the applied substrate which have been treated with the susceptor are bonded by means of a microwave generator (5), suitable for generating microwave radiation in the range from 300 MHz to 300 GHz, to give a three-dimensional object, e.g., a cup (7).

Having generally described this invention, a further understanding can be obtained by reference to certain specific examples, which are provided herein for purposes of illustration only, and are not intended to be limiting unless otherwise specified.

EXAMPLES

Example 1

Production of a Cup from a Copolyamide

A model for a cup with an external diameter of 80 mm, a height of 60 mm, and a wall thickness of 1.5 mm, composed of a copolyamide powder (VESTAMELT 840, Degussa AG, Marl) is produced in the apparatus described in FIG. 1. The susceptor comprises a graphite-based suspension, which comprises 40% by weight of water, 40% by weight of graphite, and 20% by weight of isopropanol. The apparatus has an operating temperature of about 40° C. The frequency of the microwave generator is 2,450 MHz. The layer thickness is 0.15 mm. For each layer, the radiation is introduced at a power of 700 watts, and in each case, for 30 seconds. The $d_{50}$ (median grain size) of the powder is 60 µm.

Example 2

Production of a Tensile Specimen from Nylon 12

A tensile specimen of length 160 mm and width 10 mm, and depth 4 mm, is produced in the apparatus previously described, from a nylon 12 powder (EOSINT P PA 2200, EOS GmbH Electro Optical Systems, Krailling, Germany). Ethylene glycol is used as susceptor. The apparatus has an operating temperature of about 160° C. The frequency of the microwave generator is 2,450 MHz. The depth of each applied powder layer is 0.15 mm. For each layer, the radiation is introduced at a power of 750 watts, for 45 seconds. The powder used had a $d_{50}$ (median grain size) of 55 µm.

The present application claims priority to German patent application 103 11 438.6, filed Mar. 15, 2003, which is herein incorporated in its entirety by reference, and to German patent application 103 56 193.5, filed Dec. 2, 2003, which is also herein incorporated in its entirety by reference.

Obviously, additional modifications and variations of the present invention are possible in light of the above teachings. It is therefore to be understood that within the scope of the appended claims, the invention may be practiced otherwise than as specifically described herein.

The invention claimed is:

1. A process for producing a three-dimensional object, comprising:
   a) providing a layer of pulverulent substrate, wherein the pulverulent substrate contains about 0.05 to about 5% by weight of a flow aid,
   b) selectively applying at least one microwave-absorbing first susceptor to one or more regions of the substrate, wherein the one or more regions are selected in accordance with a cross section of the three-dimensional object, wherein the first susceptor comprises a member selected from powders of metals or metal compounds, ceramic powders, graphite, activated charcoal, or one or more protic liquids selected from saturated monohydric linear aliphatic alcohols, polyhydric linear aliphatic alcohols, monohydric branched aliphatic alcohols, polyhydric branched aliphatic alcohols, monohydric cyclic aliphatic alcohols or polyhydric cyclic aliphatic alcohols, each undiluted, or in a mixture with water,
   c) treating the layer at least once with microwave radiation, to melt the one or more regions containing the first susceptor to the layer of pulverulent substrate, and, optionally, to melt the one or more regions containing the first susceptor with other regions located in one or more substrate layers situated thereunder, thereabove, or combinations thereof, wherein, said other regions optionally contain a microwave-absorbing second susceptor, and wherein said first susceptor and said second susceptor are the same or different, and
   d) cooling the layer.

2. The process of claim 1, wherein step a and step b are repeated consecutively for n times, where n is an integer greater than zero, and wherein step c is carried out after steps a and b have been repeated n times.

3. The process of claim 1, wherein step a and step b are repeated consecutively for n times, where n is an integer greater than zero, and wherein step c is carried out after each repetition of steps a and b.

4. The process of claim 1, wherein steps a and b are repeated until the three dimensional object is delineated within a matrix comprising one or more layers of the pulverulent substrate, and then step c is carried out.

5. The process of claim 4, wherein step c is carried out in a lower construction chamber of an apparatus used to prepare the three dimensional object.

6. The process of claim 1, wherein step c is carried out in an apparatus other than an apparatus used for carrying out steps a and b.

7. The process of claim 1, wherein step c is carried out in a commercially available, food-preparation microwave equipment.

8. The process of claim 1, wherein the pulverulent substrate has a median grain size of from about 10 to about 150 .mu.m.

9. The process of claim 1, wherein the microwave radiation has a frequency range from about 430 to about 6,800 MHz.

10. The process of claim 1, wherein the one or more protic liquids comprise glycerol, trimethylolpropane, ethylene glycol, diethylene glycol, butanediol, or mixtures thereof.

11. The process of claim 1, wherein the pulverulent substrate comprises one or more polymers or copolymers.

12. The process of claim 11, wherein the one or more polymers or copolymers are selected from polyester, polyvinyl chloride, polyacetal, polypropylene, polyethylene, polystyrene, polycarbonate, PMMI, PMMA, ionomer, polyamides, copolyester, copolyamides, terpolymers, ABS, or mixtures thereof.

13. The process of claim 1, wherein the pulverulent substrate contains about 0.1 to about 1% by weight of a flow aid.

14. The process of claim 1, wherein the pulverulent substrate contains one or more inorganic fillers.

15. The process of claim 14, wherein the one or more fillers comprise glass beads.

16. The process of claim 1, wherein the pulverulent substrate contains one or more inorganic or organic pigments.

17. The process of claim 1, wherein the pulverulent substrate contains one or more laser-activatable additives.

18. The process of claim 1, wherein the pulverulent substrate contains a material which can be fused or sintered via exposure to heat, and which comprises a member selected from coated grains of sand, ceramics, metals, alloys, metal powders or mixtures thereof.

19. The process of claim 1, wherein the melting and cooling results in fusion or sintering of one or more layers.

20. The process of claim 1, wherein in step c) one or more regions containing the first susceptor are melted with other regions located in one or more substrate layers situated thereunder, thereabove, or combinations thereof.

21. The process of claim 1, wherein said first susceptor is a liquid susceptor.

22. The process of claim 1, wherein said second susceptor is a liquid susceptor.

23. The process of claim 1, wherein said first and/or second susceptor is a liquid susceptor and is applied using an ink-jet printer.

24. The process of claim 1, wherein said substrate is melted in step c).

* * * * *